3,278,594
N-ARYL, N-HYDROXYARYL CARBAMIC
ACID HALIDES
Wilfred Sweeny, Wilmington, Del., assignor to E. I. du Pont de Nemours and Company, Wilmington, Del., a corporation of Delaware
No Drawing. Filed Nov. 8, 1962, Ser. No. 236,394
2 Claims. (Cl. 260—544)

This invention relates to a novel class of difunctional aromatic organic compounds. More specifically, the invention concerns a novel class of carbamic acid halides of secondary aromatic amines, both nitrogen substituents of which are aromatic radicals, one of said aromatic radicals bearing a phenolic hydroxyl group and a process for the preparation of such difunctional aromatic compounds.

From the time of the earliest recognition that linear polymeric compositions can be prepared by the condensation of suitable difunctional organic compounds, it has been appreciated that those substances which contain two types of functional groups within a single molecule are capable of polymer formation by self-condensation, if the functional groups are so chosen that they are co-reactive. Certain monomeric materials of this type have been well characterized, and a few have been widely utilized in the preparation of polymers which have been commercially exploited. Thus, for example, 6-aminocaproic acid and its amide-forming derivatives enter easily into self-condensation polymerization to produce a polyamide which is manufactured on a commercial scale. Other types of such monomeric materials have been investigated, and the polymers from them have been evaluated. There has been, however, a continuing search on the part of polymer chemists for new monomeric compositions which may be utilized in the preparation of new polymers having desirable characteristics.

It is an object of this invention to provide a novel class of difunctional aromatic organic compounds. Other objects will become apparent from the following disclosure.

The preferred class of difunctional aromatic organic compounds of the invention are characterized by the following generic structural formula:

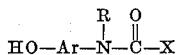

wherein Ar represent a divalent aromatic hydrocarbon radical; wherein R represents a monovalent aromatic hydrocarbon radical and X represents a halogen atom. The compounds may be prepared by the reaction of phosgene or other carbonyl halide with an aromatic secondary amine, one of the aromatic radicals of which bears a phenolic hydroxyl group. This reaction is normally effected by dissolving the phenolic secondary amine in a suitable solvent and bubbling phosgene or other carbonyl halide through the solution, thus converting the secondary amino group to the corresponding carbamyl halide without affecting the phenolic hydroxyl group. The monomeric compounds of this invention may be polymerized to high molecular weight polyurethanes by a melt process under conditions such that the normally unreactive carbamyl halide functional group undergoes condensation with the phenolic hydroxyl group.

The divalent aromatic radical Ar of the above formula may be m-, or p-phenylene, 1,3-naphthylene, 1,4-naphthylene, 1,5-naphthylene, 2,6-naphthylene, anthrylene, phenanthrylene, diphenylene, etc. As examples of the monovalent aromatic radical R, there may be named phenyl, α-naphthyl, β-naphthyl, and other comparable radicals.

Suitable secondary amines from which the carbamic acid derivatives of this invention may be prepared are characterized by the presence of two aromatic substituents on the amino nitrogen atom, one of which aromatic substituents bears a phenolic hydroxyl group. These compositions may be prepared in accordance with any of several synthetic procedures. Thus, for example, they may be prepared by the reaction of an amino phenol with a phenol under the influence of heat and pressure, by the reaction of an amino phenol with an aromatic amine as described in German Patent No. 887,345, or by the reaction of a biphenol with an aromatic amine as described in U.S. Patent No. 2,503,712. Other comparable procedures by which an aromatic primary amino group may be converted to a secondary amino group are also suitable and will be apparent to those skilled in the art.

The difunctional monomeric phenolic carbamyl halides of this invention are prepared by the reaction of phosgene or other carbonyl halides with an appropriate N-substituted amino-phenol. This reaction is normally effected by bubbling the carbonyl halide through a solution of the amino phenol in a suitable solvent at a temperature within the range from about 10° C. to about 180° C. Suitable solvents for the reaction include chlorobenzene, o-dichlorobenzene, toluene and tetrachloroethane. The passage of the carbonyl halide through the solution is normally continued for a period of about 4 hours, or until reaction is complete. Isolation of the product may be effected easily by cooling the reaction mixture, under which conditions the phenolic carbamyl halide precipitates and may be removed by filtration. Alternatively, the product may be precipitated by dilution of the reaction mixture with a suitable nonsolvent.

The process by which the difunctional monomeric compositions of this invention are subjected to self-condensation involves the heating of these monomers in the absence of solvent and/or acid acceptors. This reaction is normally effected at a temperature within the range from about 150° C. to about 250° C., the reacting mixture being maintained at that temperature for a period of between about 0.5 hour and about 20 hours, or until the evolution of hydrogen chloride ceases. Under these conditions, the normally unreactive compositions are converted to high molecular weight polymers of the polyurethane type.

Secondary aromatic amines have long been recognized as being highly unstable to oxidative degradation, and have further been characterized as possessing extremely low basic strength. It is therefore surprising that the difunctional monomeric compositions of this invention are readily prepared and are not degraded under the conditions of preparation, inasmuch as the starting materials in their synthesis contain secondary aromatic amino groups. The starting materials exhibit, on the contrary, a satisfactory order of reactivity with phosgene, and the resulting monomeric compositions are oxidatively stable. It is equally surprising that the monomers may be isolated in an uncombined state, since they contain mutually reactive functional groups. It is observed, however, that the monomeric materials may be readily isolated and stored in this state for extended periods of time; they may then be caused to undergo condensation upon the imposition of suitable thermal treatment, under which conditions polymerization is rapid and results in a product of high molecular weight suitable for the preparations of films, fibers, and other shaped articles.

This invention will be further defined by reference to the following examples, which are not intended to limit the scope of the invention in any way.

*Example I*

To 1200 cc. of warm chlorobenzene are added 100 grams of redistilled p-anilinophenol. While the solution is maintained at a temperature of 90° C., phosgene is rapidly bubbled through for a period of one hour. During the course of the reaction, the initially colorless solution becomes greenish, and an oil separates, but a clear solution is obtained at the end of one hour. The temperature is raised to 120° C., and the passage of phosgene is continued for a period of 2 hours. Upon cooling the reaction mixture to a temperature of 10–20° C., a colorless solid precipitates and is removed by filtration. The product is washed with light petroleum, and dried in a desiccator. The product corresponding to the formula

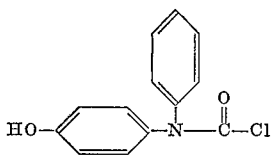

exhibits a melting point of 153–154° C., and elemental analysis without further purification shows the following results: C, 62.7%; H, 4.0%; N, 5.6%. (Calculated for $C_{13}H_{10}NO_2Cl$: C, 63.0%; H, 4.0%; N, 5.7%.)

In a manner analogous to that described in Example I there may be prepared

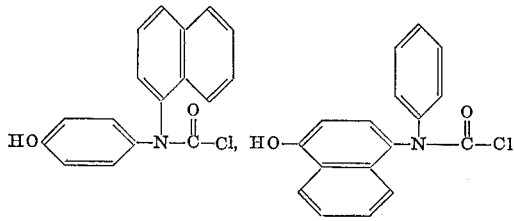

and

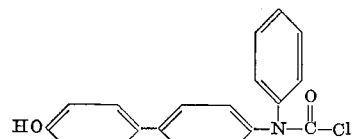

by using as the reactants, phosgene and

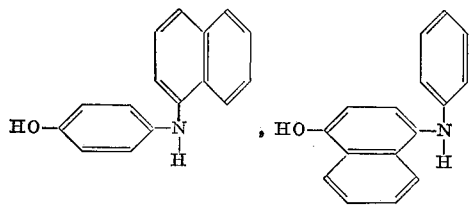

and

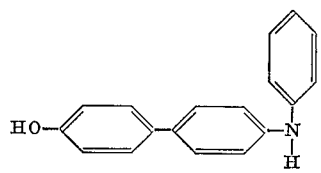

respectively. The corresponding bromocarbonyl compounds may be produced by the use of carbonyl bromide.

*Example II*

The specificity of the reaction of a carbonyl chloride with an aromatic amino group in preference to reaction with a phenolic hydroxyl group may be readily demonstrated. A solution of 2.25 grams of redistilled p-anilinophenol and 2.17 grams of phenyl chloroformate in 73 cc. of o-dichlorobenzene is heated to the point of reflux, and maintained at this temperature overnight. Nitrogen is slowly bled through the solution to assist in the removal of the hydrogen chloride evolved during the reaction. A crystalline solid separates upon cooling the reaction mixture, and is filtered and washed with 100 cc. of hexane. After recrystallization from toluene, the solid carbamate ester exhibits a melting point of 196–197° C. Elemental analysis of the product shows the following results: C, 74.7%; H, 4.9%. (Calculated for $C_{19}H_{15}NO_3$: C, 74.7%; H, 4.9%.) Infrared spectroscopy showed bands at 2.9μ, indicative of the presence of OH groups, and at 5.85μ, indicating the presence of amide carbonyl groups.

This procedure is repeated, utilizing the same quantity of p-anilinophenol, but employing 4.35 g. of phenyl chloroformate, twice the amount previously used. After heating overnight at the temperature reflux, the product which is isolated is indistinguishable from the product of the preceding process, even on determination of a mixed melting point. Thus, the reaction of the chloroformate with p-anilinophenol is effected exclusively at the amino nitrogen, with no condensation at the phenolic hydroxyl group.

*Example III*

In a 150 ml. polymer tube equipped with a capillary nitrogen inlet are placed 20 grams (0.08 mol) of N-chlorocarbonyl-p-anilinophenol. The tube and its contents are heated to a temperature of 190° C. and maintained at that temperature for a period of 15 minutes while a pressure of 25 mm. is imposed. The pressure is then reduced to 1.0 mm. and the temperature is kept at its former level for a period of 1¼ hours, following which the temperature is raised to 245° C. while the pressure is maintained at 1.0 mm. for an additional three hours. Polymerization occurs rapidly under these conditions, and the polymer is removed from the tube by dissolving in methylene chloride. Precipitation of the product is effected by treatment of the solution with methanol, following which the polymer is isolated by filtration, washed and dried. It is found to exhibit a polymer melt temperature of 256° C. and an inherent viscosity, when measured in m-cresol, of 0.6. Tough films are prepared by melt-pressing or dry casting from solution.

The difunctional carbamic acid derivatives of this invention find utility in polymer-forming reactions. They may be used for the preparation of high molecular weight homopolyurethanes as described herein. They are also useful as modifiers in other polymeric materials, for which purpose they may be added in any desired concentration to polymerization mixtures of reactants having functional groups coreactive with the phenolic hydroxyl group and carbamic acid derivatives of these difunctional compounds.

I claim:

1. A compound of the following structural formula

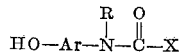

wherein Ar represents a divalent aromatic hydrocarbon radical; R represents a monovalent aromatic hydrocarbon radical and X represents a halogen atom.

2. N-chlorocarbonyl p-anilinophenol.

References Cited by the Examiner

UNITED STATES PATENTS 2,261,156  11/1941  Hentrich et al. _____ 260—544 X
2,933,519  4/1960   Sekera et al. _____ 260—544 X

FOREIGN PATENTS 128,372  1/1919  Great Britain.

OTHER REFERENCES

Dyson: "Chem. Rev.," vol. 4 (1927), pp. 109–165 (pp. 142 and 151 relied on).

LORRAINE A. WEINBERGER, *Primary Examiner.*

LEON ZITVER, *Examiner.*

R. K. JACKSON, *Assistant Examiner.*